United States Patent [19]

Tomii

[11] 3,939,486

[45] Feb. 17, 1976

[54] CATHODE RAY TUBE HAVING INDEX STRIP ELECTRODE

[75] Inventor: Kaoru Tomii, Kadoma, Japan

[73] Assignee: Matsushita Electric Industrial Co., Ltd., Kadoma, Japan

[22] Filed: July 19, 1974

[21] Appl. No.: 489,897

Related U.S. Application Data

[63] Continuation of Ser. No. 256,164, May 23, 1972, abandoned.

[30] Foreign Application Priority Data

May 26, 1971   Japan................................ 46-36536
Apr. 28, 1972   Japan................................ 47-42919

[52] U.S. Cl. ..................... 358/46; 313/471; 358/67
[51] Int. Cl.²... H04N 9/06; H04N 9/22; H04N 9/24
[58] Field of Search ............. 358/45, 46, 51, 67, 68, 358/69, 70, 71; 313/370, 418, 419, 471

[56] References Cited
UNITED STATES PATENTS

| | | |
|---|---|---|
| 2,685,047 | 7/1954 | Moore ................................. 358/68 |
| 2,744,953 | 5/1956 | Antranikian ......................... 358/46 |
| 3,784,735 | 1/1974 | Brown et al. ........................ 358/46 |

*Primary Examiner*—Robert L. Griffin
*Assistant Examiner*—George G. Stellar

[57] ABSTRACT

A cathode ray tube for use with color image signal processing system, which comprises: an evacuated envelope having a transparent faceplate; an electron gun positioned within the envelope for emitting an electron beam toward the faceplate; a deflection means for deflecting the electron beam so that the electron beam vertically and horizontally scans the faceplate; and an index strip member including a plurality of successively arranged index strips positioned at an upper or lower surface of the faceplate, each of the index strips extending in a direction perpendicular to the horizontal scanning direction of the electron beam, and a pair of start and stop index strips each positioned at one side portion of the faceplate and elongated in parallel with the index strips and in substantially the same extent as that of the vertical deflection of the electron beam.

14 Claims, 35 Drawing Figures

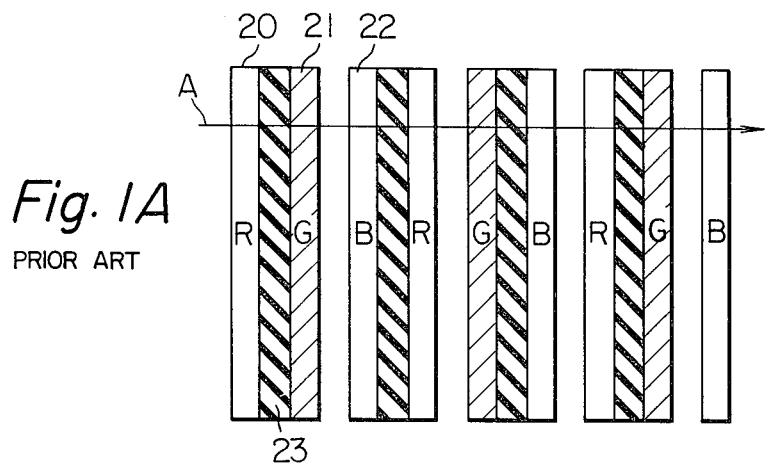
Fig. 1A PRIOR ART
Fig. 1B PRIOR ART
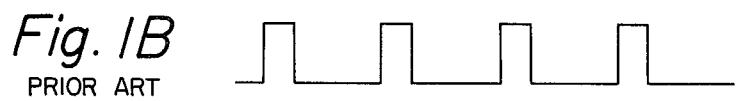
Fig. 2A PRIOR ART
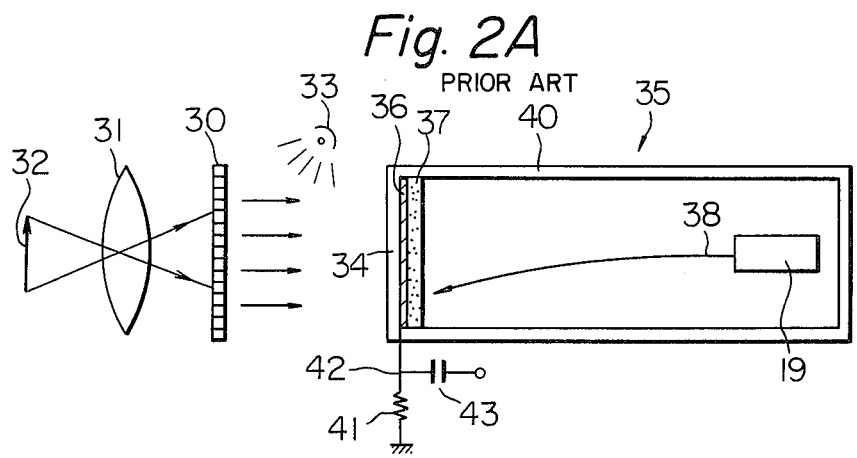
Fig. 2B PRIOR ART
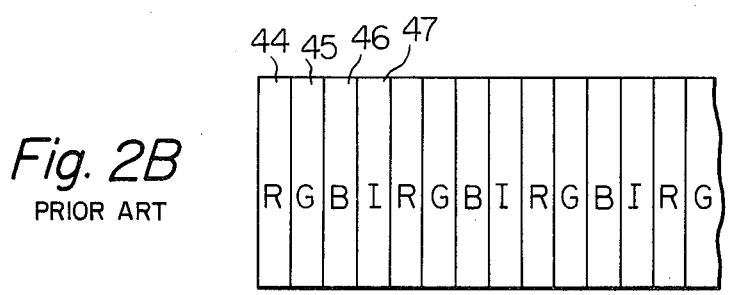

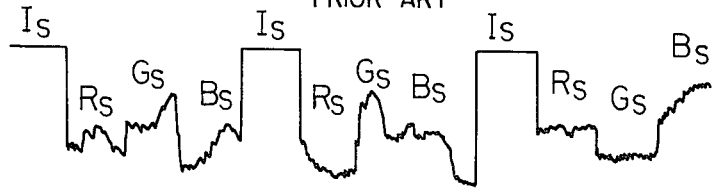
Fig. 2C
PRIOR ART
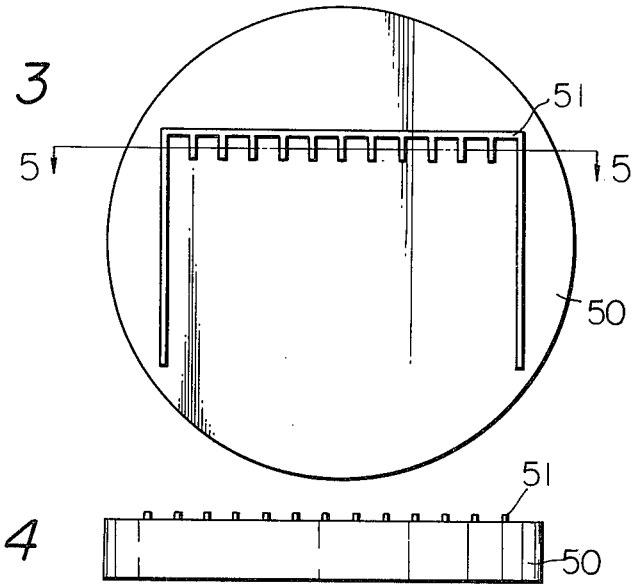
Fig. 3
Fig. 4
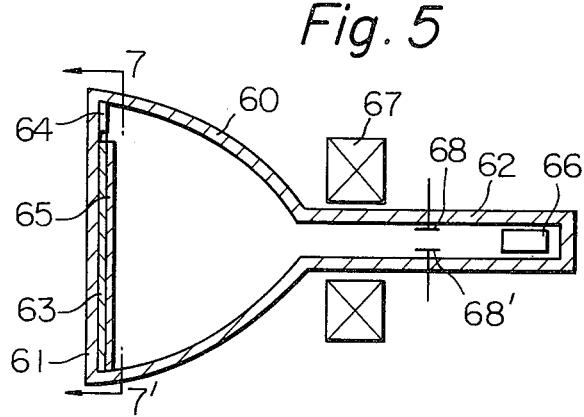
Fig. 5

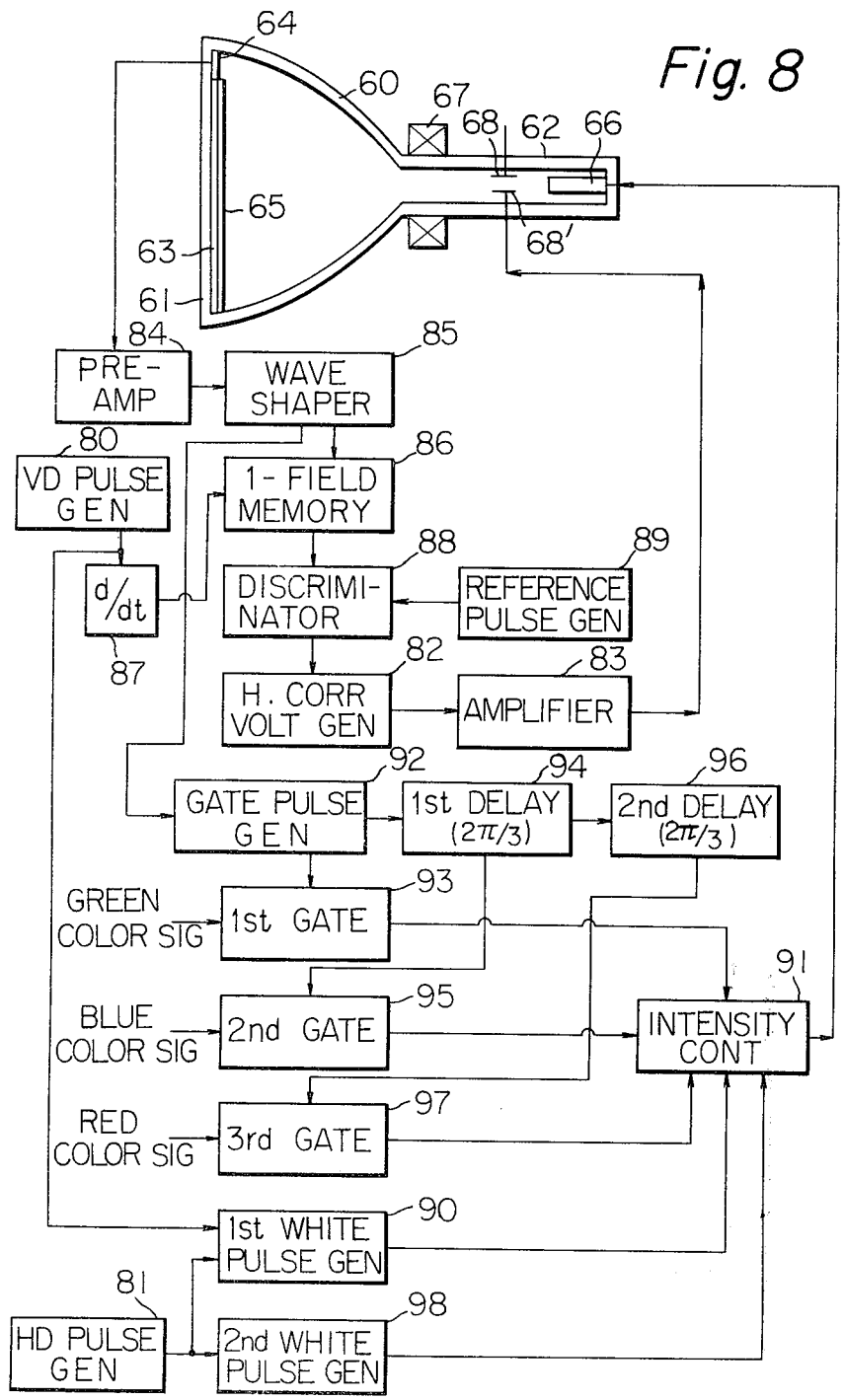

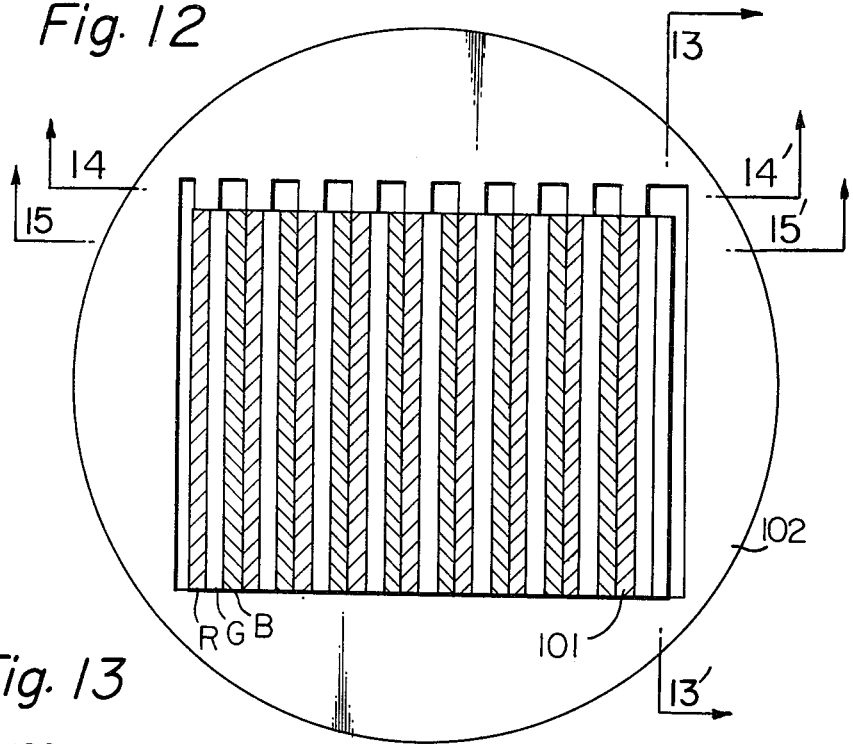
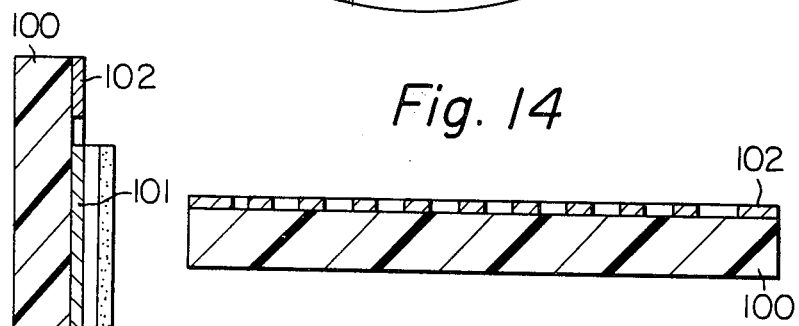
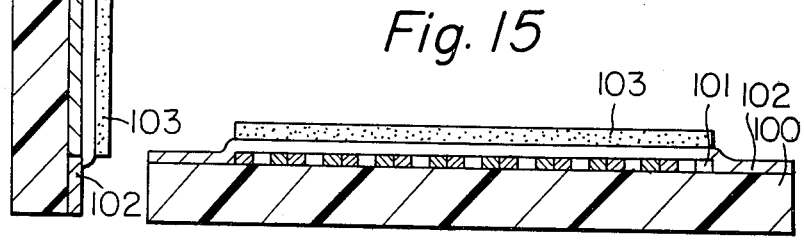

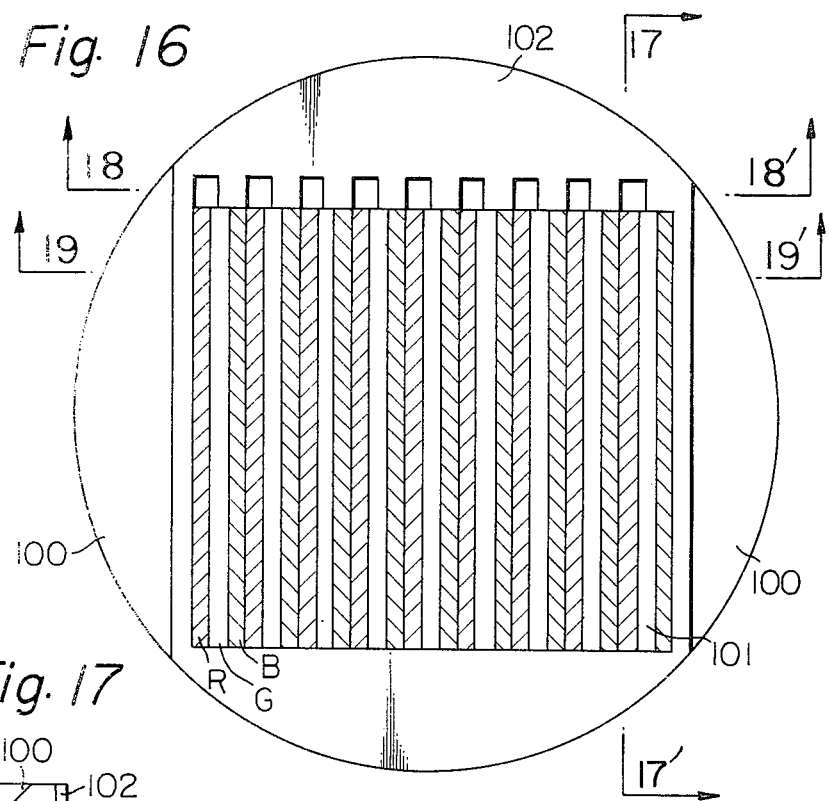
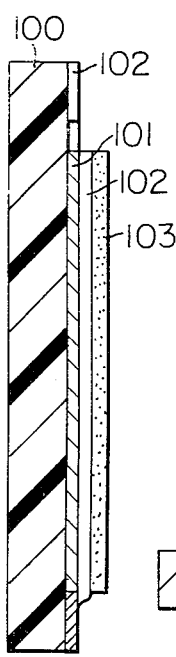
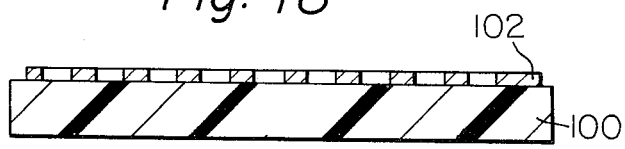
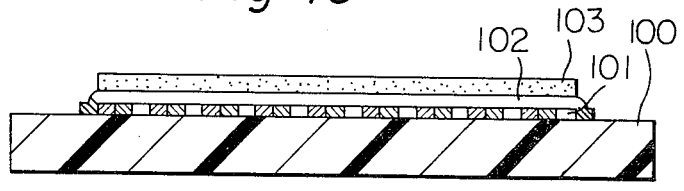

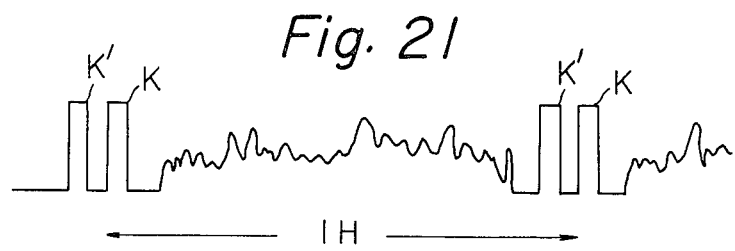
Fig. 21
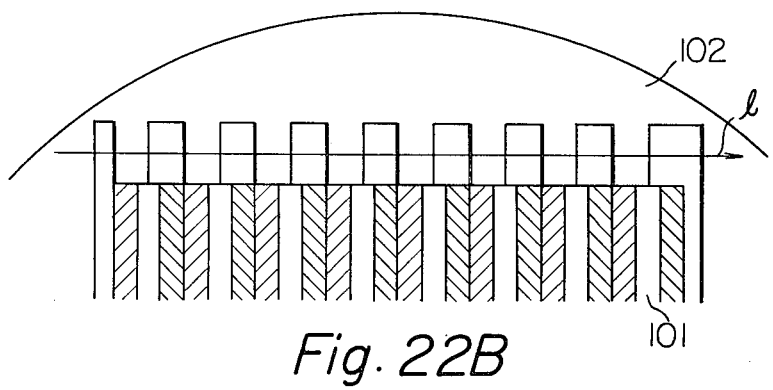
Fig. 22A
Fig. 22B
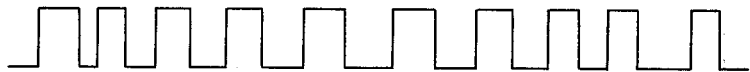
Fig. 22C
Fig. 22D
Fig. 22E
Fig. 22F

CATHODE RAY TUBE HAVING INDEX STRIP ELECTRODE

This is a continuation, of application Ser. No. 256,164, filed May 23, 1972 now abandoned.

The present invention relates to cathode ray tubes and, more particularly, to a cathode ray for use with a color video system such as color image pick-up, color facsimile and color image printing systems. The specific purpose of the invention is to provide an improved cathode ray tube which is useful for correctly converting a color image into a color video signal or for correctly reconverting the color video signal into a color image.

Generally the cathode ray tube of the invention includes a comb-shaped index strip including a plurality of successively arranged index strips positioned at an either upper or lower portion of the faceplate and a pair of start and stop index strips each positioned to extend at one side portion of the faceplate. The index strip electrode is scanned by an electron beam so as to produce an index signal which is used for separating color components contained in an image signal produced by the cathode ray tube and for correcting the scanning speed of the electron beam.

According to this invention, there is provided a cathode ray tube for use with color image signal processing system, which comprises: an evacuated envelope having a transparent faceplate; an electron gun positioned within the envelope for emitting an electron beam toward the faceplate; a deflection means for deflecting the electron beam so that the electron beam vertically and horizontally scans the faceplate; and an index strip member including a plurality of successively arranged index strips positioned at an upper or lower surface of the faceplate, each of the index strips extending in a direction perpendicular to the horizontal scanning direction of the electron beam, and a pair of start and stop index strips each positioned at one side portion of the faceplate and elongated in parallel with the index strips and in substantially the same extent as that of the vertical deflection of the electron beam.

The specific structure of the invention will be understood when the detailed description is read in conjunction with the drawings wherein:

FIG. 1A is a fragmentary view of a faceplate of a conventional color image display tube.

FIG. 1B is a diagram showing an index signal produced by the display tube.

FIG. 2A is a sectional view of a conventional color image pick-up system.

FIG. 2B is a diagram showing a color strip filter employed for the system of FIG. 2A.

FIG. 2C is a diagram showing a waveform of an image signal produced by the system of FIG. 2A.

FIG. 3 is a front view of a faceplate of a cathode ray tube according to the invention.

FIG. 4 is a sectional view taken along a line 5—5 in FIG. 3.

FIG. 5 is a sectional view showing a display tube according to the invention.

FIG. 8 is a preferred embodiment of a color image reproducing system using the display tube of FIG. 5.

FIG. 12 is a simplified front view showing a preferred embodiment of a faceplate of a camera tube according to the invention, its photo-conductive layer not being shown for the sake of clarity.

FIG. 13 is a sectional view taken along a line 13–13' in FIG. 12, a photo-conductive layer being added but not shown in FIG. 12.

FIG. 14 is a sectional view taken along a line 14–14' in FIG. 12, a photo-conductive layer being added but not shown in FIG. 12.

FIG. 15 is a sectional view taken along a line 15–15' in FIG. 12.

FIG. 16 is a simplified front view showing another embodiment of a faceplate of a camera tube according to the invention, its photo-conductive layer not being shown for the sake of clarity.

FIG. 17 is a sectional view taken along a line 17–17' in FIG. 16, a photo-conductive layer being added but not shown in FIG. 16.

FIG. 18 is a sectional view taken along a line 18–18' in FIG. 16, a photo-conductive layer being added but not shown in FIG. 16.

FIG. 19 is a sectional view taken along a line 19–19' in FIG. 16.

FIG. 21 is an image signal appearing in the system of FIG. 20.

FIGS. 22A through 22C are explanatory views showing relationship between the position of the index strip member formed on the faceplate of the tube in FIG. 20 and an index signal produced in the system of FIG. 20.

FIGS. 22D through 22H are views showing various waveforms appearing in the system of FIG. 20.

Corresponding parts are similarly numbered in the views.

Figure 6:
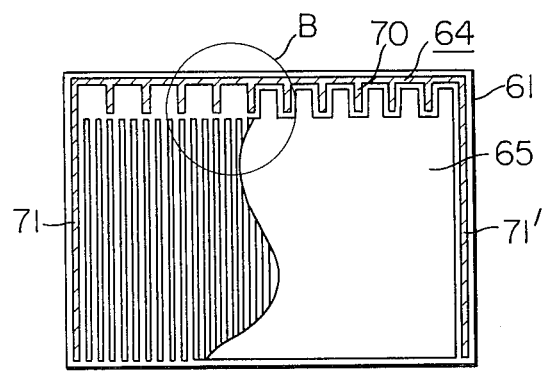
FIG. 6 is a sectional view taken along a line 7–7' shown in FIG. 5.

Referring now to the drawings and more specifically to FIG. 1A, where are diagrammatically shown red, green and blue color strips 20, 21 and 22, and index strips 23 on the faceplate of a conventional color picture tube. The color strips 20, 21 and 22 are successively arranged in a certain order and the index strips 23 are positioned at a certain pitch among the color strips 20, 21 and 22. The index strips are made of a phosphorous material or a secondary electron emissive material. When the strips are scanned by an electron beam emitted from the electron gun of the picture tube and having a constant intensity in a direction indicated by an arrow A, the index strips radiate ultra-violet rays or emit secondary electrons. The ultra-violet rays or secondary electrons are converted into an index pulse signal as shown in FIG. 1B.

When, in operation, a color signal including the three primary color components in the form of pulse trains which are delayed from one another by predetermined time intervals is applied to the electron gun, the color strips 20, 21 and 22 are successively excited to respectively radiate the color lights. At the same time, the index strips 23 are excited and the index signal is produced by the picture tube. The index signal is utilized for correcting the scanning speed of the electron beam so that the electron beam scans the color strips in synchronism with the appearing timing of the color components in the color video signal. It is, in this instance, pointed out that the electron beam generated in the picture tube should have at least a minimum intensity for producing the index signal, so that, a reproduced color image has a degraded contrast. Furthermore, when a color composite video signal produced by a color image pick-up system is converted into the color image signal to be applied to the picture tube, a component of the color composite video signal having the same frequency as the index signal should be removed so as to reproduce a color image on the faceplate of the picture tube without influence of the index strips. As a result, the reproduced color image has a degraded resolution power.

Referring to FIG. 2A, there is shown a typical conventional color image pick-up system which comprises a color strip filter 30, an object lens 31 for focusing an object 32 onto the surface of the color strip filter 30 so that an optical image of the object 32 is formed on the surface of the strip filter 30. The strip filter 30 includes index strips and red, green and blue strips which are arranged in order, so that, the optical image is spatially modulated when passing through the strip filter 30. The index strips is, for example, made of a fluorescent material and excited by illumination from a light source 33 positioned in the vicinity of the strip filter 30. The spatially modulated optical image is irradiated onto the faceplate 34 of a vidicon 35 which has a target assembly including a transparent electric conductive layer 36 disposed on the back surface of the faceplate 34 and a photo-conductive layer 37. The photo-conductive layer 37 is scanned by an electron beam 38 emitted from an electron gun 19 positioned within an envelope 40 of the vidicon 35. Since the spatially modulated optical image is irradiated on the photo-conductive layer 37, electric charges are stored in dependence on the conductivity of a point the electron beam 38 strikes. The electric charges flow through a resistor 41 to the ground thereby to generate a voltage signal at a joint 42. The voltage signal is picked up through a coupling capacitor 43 by a suitable signal processing means.

In FIG. 2B, the color strip filter 30 used in the system in FIG. 2A is illustrated in an enlarged scale, in which the red, green and blue colored strips and the index strips are designated by 44, 45, 46 and 47, respectively.

In FIG. 2C, a waveform of the voltage signal produced by the vidicon in FIG. 1A is shown, which includes index signal $I_s$, red, green and blue color signals $R_s$, $G_s$ and $B_s$.

However, the provision of indexing strips in alternate relationship with the recurrent groups of color filters intercept part of the image light, and thus reduces the total amount of usable light. In addition, inherent nonlinerity of the circuit parameters in the line sweep generator would introduce error in beam alignment, thus resulting in poor fidelity in the reproduction of color television signal.

In order to avoid the above stated problems, a novel cathode ray tube usable for a color picture tube or a color camera tube is provided by the present invention, which has a comb-shaped index strip member formed on an upper or lower portion of the faceplate thereof. In FIG. 3, a faceplate 50 of a cathode ray tube according to the invention is illustrated, which has a comb-shaped index strip member 51. The strip member 51 includes a plurality of index strips having a uniform height and a pair of start and stop strips at the utmost ends. The start and stop strips have heights substantially equal to the height of the effective area of the faceplate 50 and extend at side portions of the faceplate 50. The start and stop strips are useful for producing start and stop signals. The strip member 51 is, for example, deposited on the inner surface of the faceplate 50 as shown in FIG. 4. The strip member may be made of either a conductive, phosphorous or secondary electron emissive material.

In FIG. 5, a color picture tube or a cathode ray tube according to the invention is shown, which comprises an evacuated envelope 60 having a faceplate 61 and a neck 62. On the inner surface of the faceplate 61 are deposited red, green and blue color phospsor strips 63 successively arranged in a certain order. A comb-shaped index strip member 64 is formed on the inner surface of the faceplate 61 about the phosphor strips 63. A metal 65 is formed on the color strips 63 in such a manner as to expose the index strip member 64. A usual electron gun 66 is placed in the neck 62, which emits an electron beam toward the faceplate 61. A horizontal deflecting coil 67 surrounds the neck 62, for deflecting the electron beam emitted from the electron gun 66 so that the electron beam scans the index strip member 64 and the metalback 65 in a direction perpendicular to the longitudinal direction of the color phosphor strips 63. A pair of additional horizontally deflecting plates 68 and 68' are positioned within the neck 62. A vertical deflection coil (not shown) is placed around the neck 62.

In FIG. 6, the inner portion of the faceplate 61 is shown in more detail, wherein the index strip member includes a plurality of index strips having a uniform height and a pair of start and stop strips 71 and 71' at the opposite edges of the faceplate 61. The start and stop strips extend sideways of the phosphor strips 63.

Figure 7:
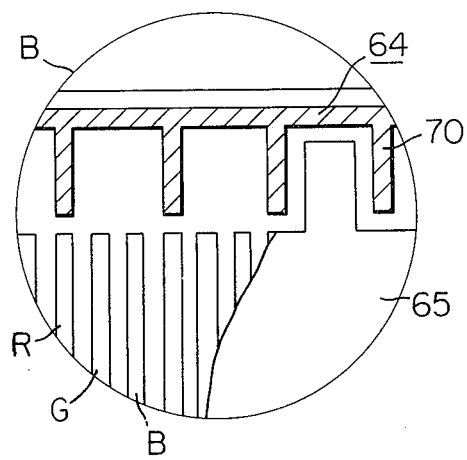
FIG. 7 is a fragmentary elevational view of an encircled portion in FIG. 6.

FIG. 7 shows in an enlarged scale a portion encircled by a circle B in FIG. 6.

Figure 9A:
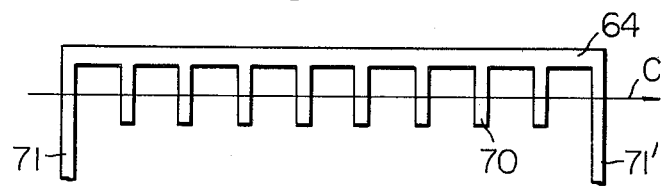
FIGS. 9A and 9B are explanatory views showing relationship between an index strip member formed on the faceplate of the display tube of FIG. 5 and an index signal produced by the display tube.
Figure 9B:
Figure 10A:
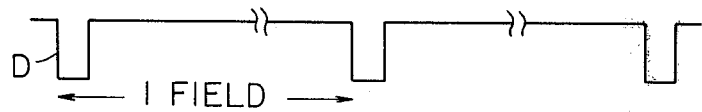
FIGS. 10A through 10B are explanatory view of operation of a one-field memory circuit in the system of FIG. 6.
Figure 10B:
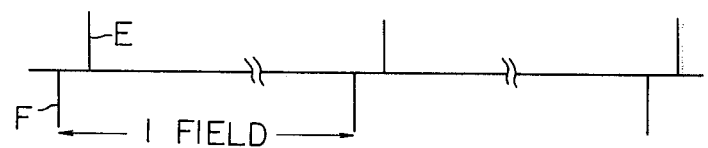

In FIG. 8, a color image reproducing system using the picture tube shown in FIGS. 5 to 7. The image reproducing system comprises a vertical driving pulse (VD pulse) generator 80 and a horizontal driving pulse (HD pulse) generator 81. The VD and HD pulse generators 80 and 81 respectively generate VD and HD pulse trains which in known manner effect rectangular scanning of the electron beam emitted from the electron gun 66 by means of respective deflection voltage generators and associated tube apparatus (not shown). Thus, the electron beam emitted from the electron gun 66 scans the index strip member made of, in this case, an electrically conductive material and the metalback 65 in a manner of, for example, interlacing. The electron beam is deflected to provide a line scan transverse to the index strips 70 during the vertical blanking time period and subsequently scan the start index strip 71, the metalback 65 and stop index strip 71' in the order named. When the electron beam scans the index strip 70, the intensity of the electron beam is increased to a white level by an intensity controller 91 which is, at this instant, energized by a white pulse produced by a first white pulse generator 90. The first white pulse generator 90 produces the white pulses by using the VD and HD pulses from the VD and HD pulse generators 80 and 81. When the index strips 70 are scanned by the electron beam as indicated by an arrow C as shown in FIG. 9A, an index pulse signal appears in the index strip member 64 having a waveform shown in FIG. 9B. It is, in this instance, seen from FIGS. 9A and 9B that the index pulses appear at time positions deviated from those corresponding to the positions of the index strip 70 and the start and stop strips 71 and 71' because the scanning speed of the electron beam varies due to non-linearlity of the horizontal deflection voltage, etc. The index signal is picked up and amplified by a pre-amplifier 84. The amplified index signal is delivered to a wave shaper 85 which wave-shapes the index signal by removing higher harmonics contained in the index signal. The wave-shaped index signal is applied to one input of a 1-field memory circuit 86 which memorize the wave-shaped index signal during a time period corresponding to one field usually equal to 1/60 seconds. The VD pulse train is, on the other hand, delivered to a differentiator 87 which then produces the reset and clear pulses. When the VD pulses successively appears as shown by rectangular pulses D in FIG. 10A, the reset and clear pulses are spike pulses E and F as shown in FIG. 10B. The reset and clear pulses are then applied to another input of the 1-field memory circuit 86. The 1-field memory circuit 86 repeatedly produces a signal having a frequency equal to that of the index signal during a time from the reset pulse to the clear pulse. The signal from the 1-field memory circuit 86 is delivered to one input of a discriminator 88. A reference pulse generator 89 produces a reference pulse train having a constant repetition frequency. The reference pulses are applied to another input of the discriminator 88 which produces a correction signal having a polarity and amplitude according to difference between the phases of the signal from the 1-field memory circuit 88 and the reference pulses from the reference pulse generator 89. The correction signal is applied to a horizontal correction voltage generator 82 which then modulates the amplitude of the horizontal deflection correction voltage in accordance with the correction signal. The horizontal deflection correction voltage is amplified by an amplifier 83 and delivered to the additional electrodes 68 and 68'. It is to be noted that the scanning speed of the electron beam is controlled so that the beam is repositioned as it scans along the line path. The electron beam is therefore deflected at a constant rate as it provides line scanning.

Figure 11:
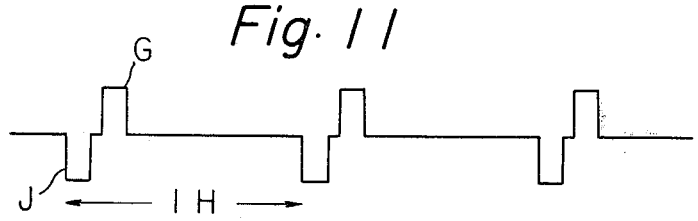
FIG. 11 is a diagram showing waveforms of white pulses and synchronizing pulses produced in the system of FIG. 8.

The HD pulse from the generator 81 is, on the other hand, applied to a second white pulse generator 98 which then produces white pulses as indicated by G in FIG. 11. The white pulses are synchronized with the horizontal driving pulses as indicated by J in FIG. 11. The white pulses are delivered to an intensity controller 91 which increases the intensity of the electron beam to a white level. As the electron beam scans the start strip 71 of the index strip member 64, a white pulse is generated to increase the beam intensity to a sufficient level to produce a start signal. The start signal is amplified by the pre-amplifier 84, wave-shaped by the wave shaper 85 and is used to trigger a gate pulse generator 92 which then starts to produce a gate pulse signal having a repetition frequency corresponding to a space frequency of the color phosphor strips 63 on the faceplate 61. The gate pulse signal is applied to a first gate 93 which receives a green color signal and passes therethrough the color signal when triggered by gate pulses of the gate signal. The gate signal is also applied to a first delaying circuit 94 which delays the gate signal in phase by $2\pi/3$. The delayed gate signal is applied to a second gate 95 which receives a blue color signal and passes therethrough the blue color signal when triggered by pulses of the delayed gate signal. The delayed gate signal is also applied to a second delaying circuit 96 which further delays the delayed gate signal by $2\pi/3$. The further delayed gate signal from the second delaying circuit 96 is applied to a third gate 97 which receives a red color signal and passed therethrough when triggered by gate pulses of the further delayed gate signal applied thereto. The green, blue and red color signals passed through the first, second and third gates 93, 95 and 97 are applied to the intensity controller 91, which controls the intensity of the electron beam in accordance with the magnitudes of the color signals.

In FIGS. 12 to 15, a faceplate of a camera tube of the invention is shown, on which a color strip filter 101 is disposed. The color strip filter 101 includes a plurality of red, green and blue color strips R, G and B which are successively arranged in a certain order. A transparent conductive layer 102 is formed on the strip filter 101 and the faceplate 100. The conductive layer 102 is removed in a mosaic pattern as shown in black in FIG. 12, so that the transparent conductive layer 102 acts as an index strip member. A photo-conductive layer 103 is disposed on a portion of the conductive layer 102 corresponding to the strip filter 101.

In FIGS. 16 to 19, another faceplate of a camera tube according to the invention is shown, on which a color strip filter 101 is disposed. A transparent conductive layer 102 is disposed on the strip filter 101 and the faceplate 100. A photoconductive photo-conductive 103 is formed on a portion of the strip filter 101. The conductive layer 102 is removed in a similar manner as in FIG. 12.

Figure 20:
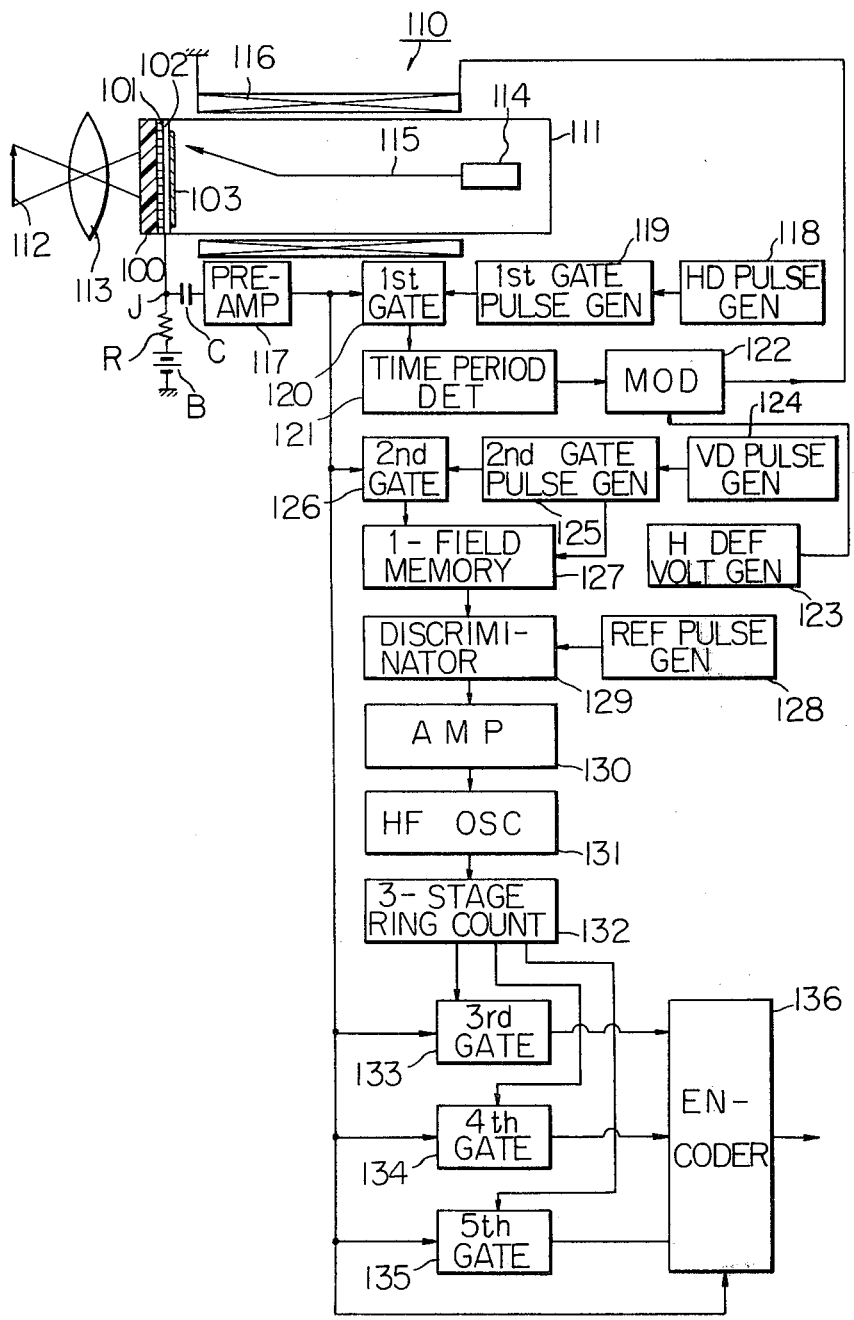
FIG. 20 is a schematic block diagram of a color image pick-up system using the camera tube shown in FIGS. 12 to 19.

In FIG. 20, a color image pick-up system using a camera tube having a faceplate with a target as shown in FIGS. 12 to 19. The camera tube generally designated by 110 includes an evactuated envelope 111 having a faceplate 100. On the inner surface of the faceplate 100 is formed a target which includes a color strip filter 101, transparent conductive layer 102 and a photo-conductive layer 103. The filter 101, conductive layer 102 and the photo-conductive layer 103 are constructed in the same manner as shown in FIGS. 12 to 19. A color optical image 112 to be picked up is focussed by an optical arrangement such as an object 113 onto the faceplate 100. The thus focussed optical image is spatially modulated by the color strip filter 101 and builds up a pattern of electrostatic charges on the photo-conductive layer 103. An electron gun 114 is placed within the opposite end of the envelope 111 to the faceplate 100, so that, an electron beam having a constant intensity emitted from the electron gun 114 is directed to and bombarded onto the photo-conductive layer 103 as indicated by an arrow 115. Horizontal and vertical deflection coils 116 are disposed along the beam path between the faceplate 100 and the electron gun 114 energized by currents so as to vertically and horizontally deflect the electron beam whereby the photo-conductive layer 103 is scanned in rectangular form. The intensity of the current flowing through the conductive layer 102 is varied due to the electric pattern stored in the layer 103. Since the conductive layer 102 is connected through a resistor R to a battery B, a potential variation proportional to the intensity variation of the electron beam appears at a joint J. The potential variation at the joint J is picked up through a coupling capacitor C by a pre-amplifier 117. When the electron beam scans the photo-conductive layer 103, an image signal appears on an output of the pre-amplifier 117, having a waveform shown in FIG. 21. It is seen horizontal from the waveform that the image signal includes start and stop pulses indicated by K and K' and spaced from one another by a time interval corresponding to 1H. An HD pulse generator 118, on the other hand, produces an HD pulse signal which is applied to a first gate pulse generator 119. The gate pulse generator 119 produces first gate pulses appearing in synchronism with the HD pulse from the HD pulse generator 118. The gate pulses are applied to a first gate 120 which then selectively passes therethrough start pulses contained in the image signal from the pre-amplifier 117. The start pulses passed through the first gate 120 is applied to a period detector 121 which produces a voltage signal having a voltage proportional to the period of the start pulses. The voltage signal from the detector 121 is delivered to a modulator 122 which then modulates in amplitude a horizontal deflection voltage signal from a horizontal deflection voltage generator 123. The thus modulated orizontal deflection voltage is applied to the deflection coils 116 whereby the electron beam from the electron gun 112 is deflected through a constant deflection angle.

Figure 22G:
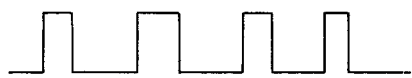
Figure 22H:
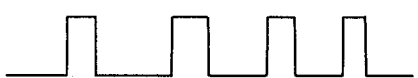

During the vertical blanking interval, the electron beam is swept across the index strips as shown by arrow in FIG. 22A. An index signal appears on the output of the pre-amplifier 117, having a waveform as shown in FIG. 22B. As seen from FIGS. 22A and 22B, time positions of the index pulses are deviated from time positions corresponding to the positions of the index strips, since the scanning speed of the electron beam on the photo-conductive layer 103 varies due to the non-linearlity of the horizontal deflection voltage, etc. The VD pulses from the VD pulse generator 124 is, on the other hand, applied to a second gate pulse generator 125 which then produces second gate pulses synchronized with the VD pulses and having a pulse width equal to 1 H. The second gate pulse generator 125 also produces reset pulses appearing just before the leading edge of each second gate pulse and having a pulse width much shorter than that of the second gate pulses. The second gate pulses are applied to a second gate 126 when then selectively passes therethrough the index signal from the pre-amplifier 117. The index signal passed through the second gate 126 is applied to a 1-field memory circuit 127 which memorizes the index signal and repeatedly produces the index signal until the memory circuit 127 is energized by the reset signal from the second gate pulse generator 125. A reference pulse generator 128 produces a reference pulse signal which would be produced when the electron beam scans at a constant scanning speed on the index strips. The reference pulse signal and the index signal are applied to a discriminator 129 which then produces a control signal having a polarity and an amplitude representing difference in phase between the index and reference pulse signals, as shown in FIG. 22D. The voltage signal from the discriminator 129 is amplified by an amplifier 130 and applied to a high frequency oscillator (VCO) 131 which then produces a signal (FIG. 22E) having three times the frequency of the color signal delivered from pre-amplifier 117. The signal from the oscillator 131 is delivered to a 3-stage ring counter 132 which is, for example, constituted by three flip-flop circuits sequentially distributes on its three output terminals three pulse signals as shown in FIGS. 22F, 22G and 22H. The three pulse signals are applied to third, fourth and fifth gates 133, 134 and 135, respectively, to gate on the primary three color signal components in serial form. The color contents are converted by an encoder 136, which encodes the gated signals into a composite color video signal of a desired form.

Figure 23:
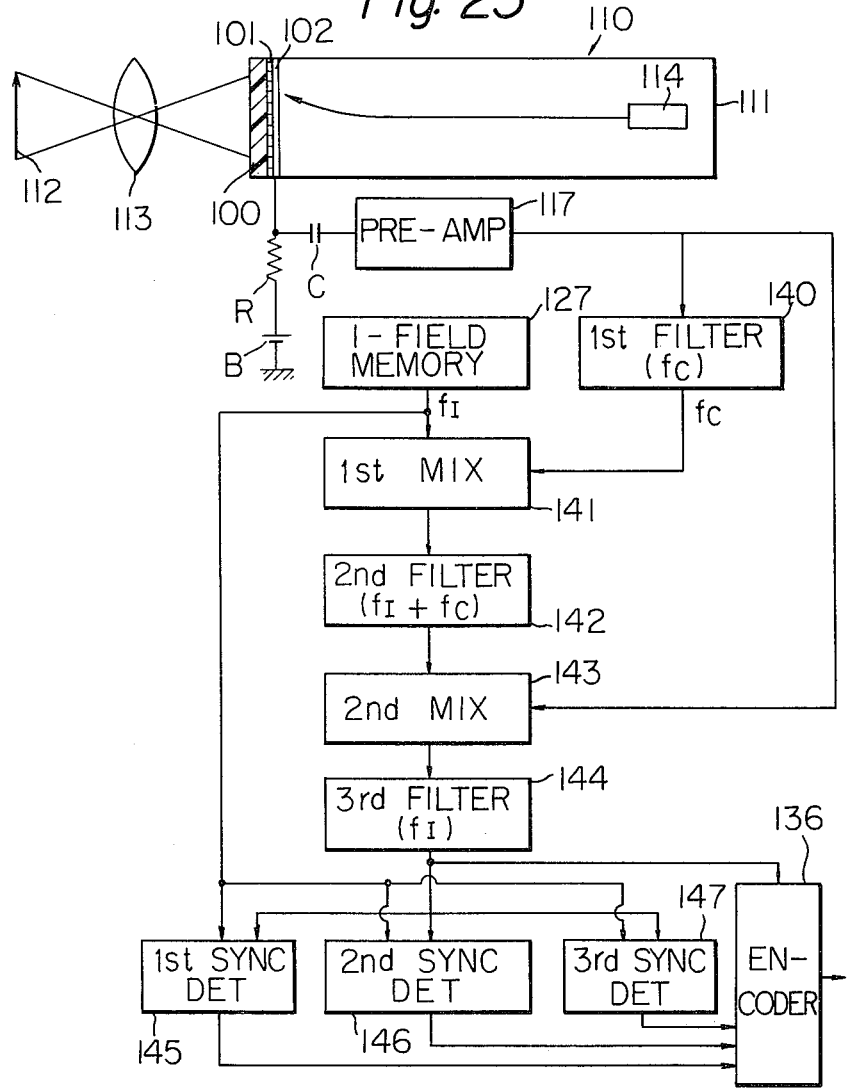
FIG. 23 is a schematic block diagram of another embodiment of a color image pick-up system using the camera tube shown in FIGS. 12 to 19.

In FIG. 23, another form of color image pickup system employing the camera tube shown in FIGS. 12 to 19 is shown, which includes the same elements as the system of FIG. 20 for correcting the horizontal scanning speed of an electron beam emitted from the electron gun 114 although those elements are not shown in this figure. A 1-field memory circuit 127 repeatedly produces the index signal during one field while being controlled by the same elements as that of FIG. 20 although those elements are not shown in this case. The color strips of the strip filter 101 have, in this case, a common space frequency and accordingly an image signal from the pre-amplifier 117 contains color contents having a common frequency ($f_c$). The color contents in the image signal is separated by a first filter 140 having a central frequency ($f_c$). The separated color contents are applied to a first mixer 141 which mixes the color contents with the index signal having, in this case, a frequency ($f_i$). The mixed signal from the first mixer 141 contains a component having a frequency equal to ($f_i + f_c$). The component of the frequency ($f_i + f_c$) passes through a second filter 142 of a central frequency ($f_i + f_c$) and mixed with the image signal from the preamplifier 117 by the second mixer 143. An output signal of the second mixer 143 includes a component having a frequency ($f_i$) and an amplitude equal to that of the color component in the image signal. The component of the frequency ($f_i$) passes through a third filter 144 having a central frequency ($f_i$) and undergoes synchronizing detection by first, second and third synchronizing detectors 145, 146 and 147. The thus detected color components are applied to an encoder 136 which converts the color contents into a color video signal of a desired form. The output signal from the third filter 144 is utilized in the encoder 136 for making a luminance content to be contained in the output video signal of the encoder 136.

It should be apparent from the above description that an improved cathode ray tube for a color camera tube or color picture tube has been provided.

It will be understood that the invention is not to be limited to the exact construction shown and described and that various changes and modifications may be made without departing from the spirit and scope of the invention, as defined in the appended claims.

What is claimed is:

1. A color television camera tube comprising in combination: an evacuated envelope having a faceplate at one end thereof and an electron gun at the other end for emitting an electron beam toward said faceplate, a color filter on said faceplate and having recurrent groups of successively arranged vertically extending strips for passing light of different colors, a photoelectrical layer inwardly from said filter, means for scanning said electron beam in a horizontal direction, means for deflecting said beam in a vertical direction to scan a given rectangular area of said photoelectrical layer, a comb-like electrode disposed on said faceplate outside of said given rectangular area and adjacent to one horizontal edge of said scanned area and having a plurality of vertically extending, horizontally equally spaced apart teeth, and a pair of electrodes disposed within said scanned area and extending along the opposite vertical edges of said scanned area.

2. A color television camera tube as claimed in claim 1, wherein said teeth are in alignment with said color filter strips.

3. A cathode ray tube comprising in combination: an evacuated envelope having a faceplate at one end thereof, an electron gun at the other end for emitting an electron beam toward said faceplate, a phosphor screen on said faceplate, means for scanning said electron beam in a horizontal direction, means for deflecting said electron beam in a vertical direction to form a rectangular raster on said phosphor screen, said phosphor screen having recurrent groups of successively arranged vertically extending color emitting strips, a comb-like electrode disposed on said faceplate outside of said raster adjacent to one horizontal edge of said raster and having a plurality of vertically extending, horizontally equally spaced apart teeth, and at least one elongated electrode disposed in said raster and extending along a vertical edge of said raster.

4. A cathode ray tube as claimed in claim 3, further comprising an auxiliary electrode disposed adjacent said electron gun.

5. A cathode ray tube as claimed in claim 3, wherein said teeth are in alignment with said color emitting strips.

6. The improvement of claim 5, wherein said at least one elongated electrode comprises two elongated electrodes disposed in said raster and extending respectively along opposite vertical edges of said raster.

7. The improvement of claim 6, wherein said two vertical electrodes are integral with said comb-like electrode.

8. In a color television receiver adapted to receive a composite color television signal including a color video signal interleaved with a vertical blanking pulse, comprising a cathode ray tube having a faceplate at one end thereof, an electron gun at the other end for emission of an electron beam toward said faceplate, means for modulating in intensity said electron beam in accordance with the color video signal, a phosphor screen on said faceplate, means for scanning said beam in a first direction, means for deflecting said beam in a second direction normal to said first direction to form a rectangular raster on said phosphor screen, said phosphor screen having recurrent groups of successively arranged color emitting strips extending parallel to said second direction, the improvement comprising:

a. a comb-like electrode arranged on said faceplate outside of said raster and having a plurality of teeth successively arranged at equal spacing along one edge of said raster parallel with said first direction;

b. an elongated electrode arranged on said faceplate such that said electron beam impinges thereon at the start of each scanning to produce a start signal;

c. an auxiliary electrode adjacent said electron gun;

d. circuit means for causing said deflecting means to deflect said electron beam to said comb-like electrode to scan thereacross during the interval of said vertical blanking pulse to produce an indexing signal;

e. memory means coupled to said comb-like electrode for storing said indexing signal for the duration of one field scan;

f. a signal source producing a constant frequency signal;

g. means connected to said memory means and to said signal source for comparing said indexing signal and said constant frequency signal to produce a control signal, said control signal being applied to said auxiliary electrode;

h. means coupled to said elongated electrode for generating trains of regularly occurring pulses; and i. gating means energized by said pulses and adapted to receive said color video signal for sequentially gating on said video signal to said modulating means.

9. The improvement of claim 8, further comprising means for intensifying said electron beam while said comb-like electrode is scanned.

10. The improvement of claim 8, wherein said teeth are in alignment with said color emitting strips.

11. A color television transmitter including a color camera tube having a faceplate at one end thereof, an electron gun at the other end for emission of an electron beam toward said faceplate, a color filter on said faceplate and having recurrent groups of successively arranged strips extending in a first direction for passing light of different colors, a photoelectrical layer inwardly from said filter, means for scanning said electron beam in a second direction normal to said first direction, means for deflecting said beam in a direction parallel with said first direction whereby said photoelectrical layer is scanned in a rectangular form, said scanning and deflecting means thereby cooperating with one another to produce a video signal which will contain a vertical blanking pulse at an output terminal of said tube, the improvement comprising:

a. a comb-like electrode arranged on said faceplate outside of the rectangular scanned area and having a plurality of teeth successively arranged at equal spacing along one edge of said rectangular form parallel with said second direction;

b. circuit means for causing said deflecting means to deflect said electron beam to said comb-like electrode to scan thereacross during the interval of said vertical blanking pulse to produce an indexing signal;

c. memory means coupled to said comb-like electrode for storing said indexing signal for the duration of one field scan;

d. means coupled to said memory means for generating trains of pulses representative of the instantaneous freqencies of said indexing signal, said pulse trains being equally spaced from each other; and e. gating means energized by said pulses and adapted to receive said video signal for sequentially gating on each color signal component of said video signal.

12. The improvement of claim 11, wherein said pulse generating means comprises a signal source producing a signal having a constant frequency, comparing means for comparing the frequencies of said indexing signal and said constant frequency signal to produce a control signal, an oscillator producing a signal having a frequency three times higher than that of each color signal component contained in a single line scan period, modulating means coupled to said comparing means for modulating the frequency of said signal in accordance with said control signal, and means for sequentially separating said modulated signal.

13. The improvement of claim 12, wherein said comparing means is a discriminator.

14. The improvement of claim 12, wherein said separating means is a three-stage ring counter.

* * * * *